United States Patent [19]

Blumenstock et al.

[11] Patent Number: 5,220,896
[45] Date of Patent: Jun. 22, 1993

[54] TANK-VENTING ARRANGEMENT AND METHOD FOR CHECKING THE TIGHTNESS THEREOF

[75] Inventors: Andreas Blumenstock, Ludwigsburg; Helmut Denz; Ulrich Steinbrenner, both of Stuttgart; Ernst Wild, Oberriexingen, all of Fed. Rep. of Germany

[73] Assignee: Robert Bosch GmbH, Stuttgart, Fed. Rep. of Germany

[21] Appl. No.: 811,526

[22] Filed: Dec. 20, 1991

[30] Foreign Application Priority Data

Dec. 20, 1990 [DE] Fed. Rep. of Germany ....... 4040896

[51] Int. Cl.$^5$ .................................................. F02M 33/02
[52] U.S. Cl. .................................... 123/520; 123/198 D
[58] Field of Search .................... 123/198 D, 516, 518, 123/519, 520, 521

[56] References Cited

U.S. PATENT DOCUMENTS

| | | | |
|---|---|---|---|
| 4,817,576 | 4/1989 | Abe | 123/518 |
| 4,862,856 | 9/1989 | Yokoe | 123/519 |
| 4,872,439 | 10/1989 | Sonoda et al. | |
| 4,949,695 | 8/1990 | Uranishi | 123/198 D |
| 5,021,071 | 6/1991 | Reddy | 123/518 |
| 5,085,194 | 2/1992 | Kuroda | 123/520 |
| 5,143,035 | 9/1992 | Kayanuma | 123/520 |

FOREIGN PATENT DOCUMENTS 0164763 12/1980 Japan .................................. 123/518

Primary Examiner—Carl S. Miller
Attorney, Agent, or Firm—Walter Ottesen

[57] ABSTRACT

A tank-venting arrangement includes: a tank; an adsorption filter connected to the tank; a tank-venting valve interconnecting the adsorption filter and the intake pipe of the engine; a control unit for driving the tank-venting valve so that it closes or opens; a pressure difference sensor for measuring the pressure difference between the pressure in the tank and the ambient pressure; and, an integrating unit for determining the time integral of the pressure difference. With this tank-venting arrangement, a simple and reliable determination can be made as to when so much fuel vapor should have been adsorbed in the active charcoal filter so that when the tank-venting valve is opened thereafter, a lean correction by means of a lambda controller can be required. If this lean correction is not made, this is an indication that the fuel flowing from the tank has not reached the tank-venting valve so that the tank-venting arrangement leaks or is obstructed.

8 Claims, 2 Drawing Sheets

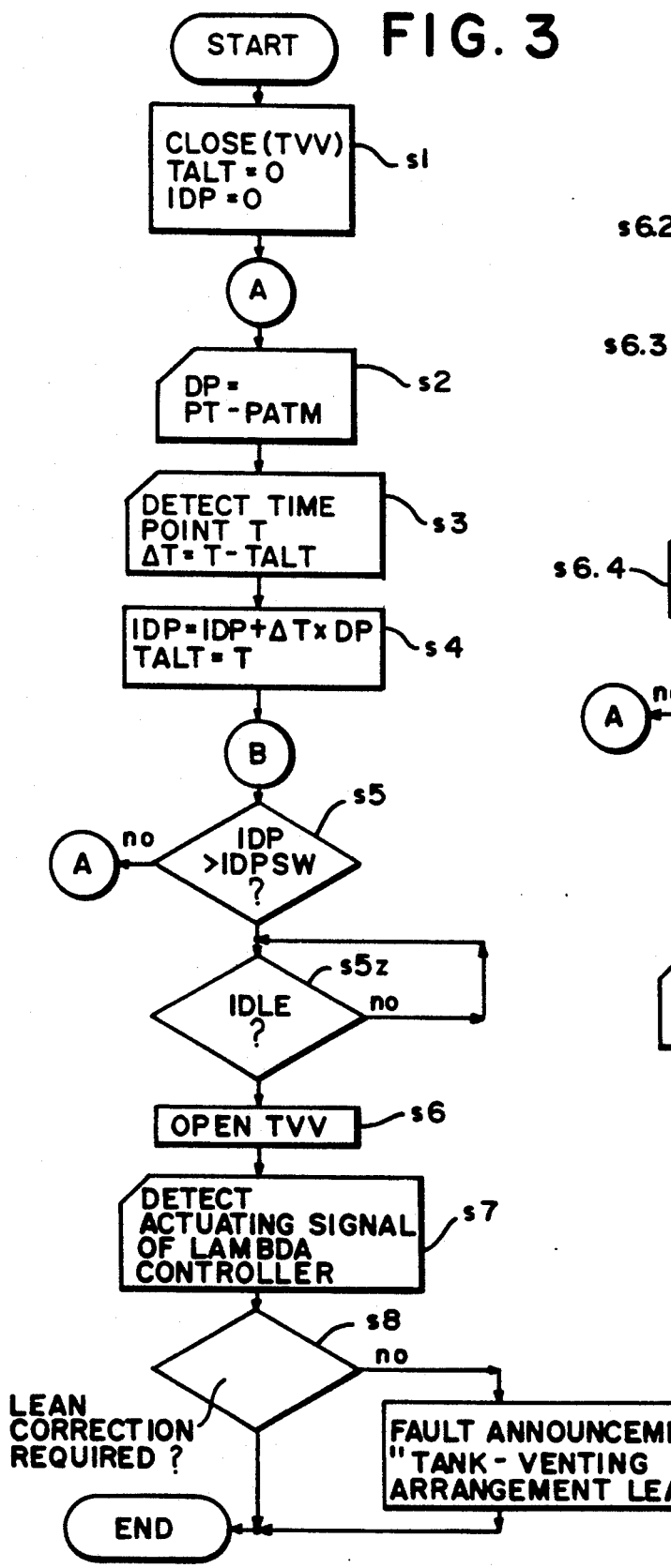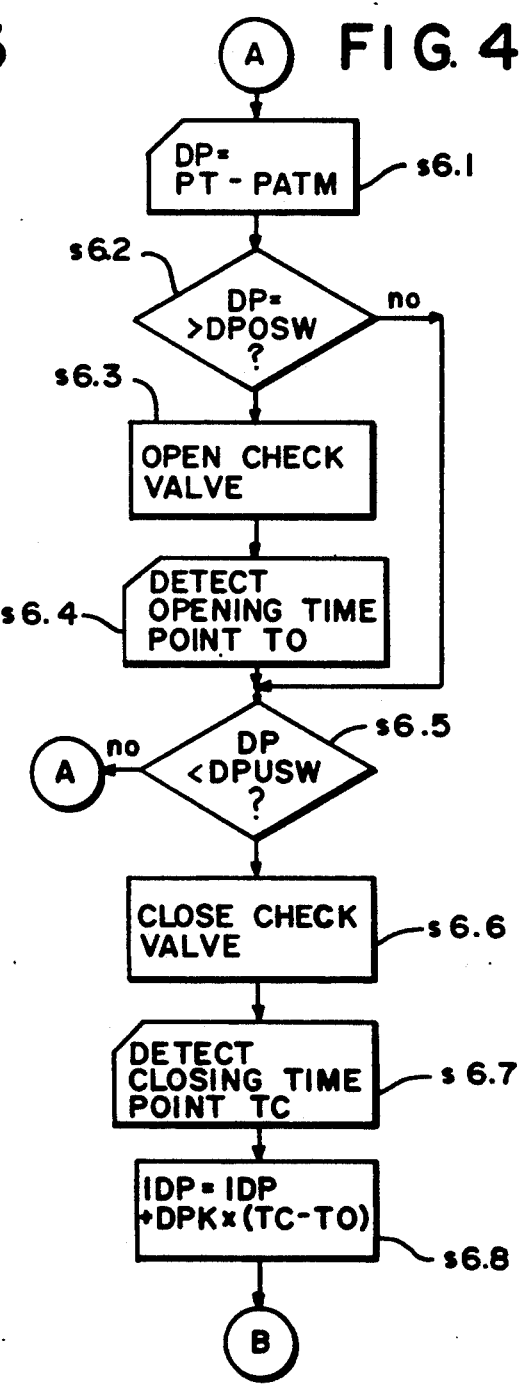

TANK-VENTING ARRANGEMENT AND METHOD FOR CHECKING THE TIGHTNESS THEREOF

FIELD OF THE INVENTION

The invention relates to a tank-venting arrangement for a motor vehicle and to a method for checking the tightness thereof.

BACKGROUND OF THE INVENTION

It is known to utilize check valves in tank-venting arrangements. In the following, a check valve which opens in response to overpressure in the tank will be referred to as an overpressure valve while a check valve which opens in response to underpressure will be referred to as an underpressure valve.

The simplest tank-venting arrangements include only an active charcoal filter between the tank and a tank-venting valve with the charcoal filter being provided with a venting line. An overpressure in the tank can be obtained to reduce the vapors from the fuel by arranging valves between the tank and the charcoal filter. A tank-venting arrangement of the kind described above is disclosed, for example, in U.S. Pat. No. 4,872,439. This tank-venting arrangement includes a check valve and an overpressure valve and an underpressure valve in parallel with the check valve and between the tank and the active charcoal filter. The check valve is opened when a tank closure is opened.

In various countries, it is required that the tank-venting arrangement be checked for tightness independently of whether a tank-venting arrangement is configured for normal pressure or overpressure. According to a suggestion of the California Environmental Authorities (CARB), the tightness is intended to be checked in that an investigation is made when the tank-venting valve is opened as to whether a lambda controller has to adjust its actuating signal in a "lean" direction. In this suggestion, the assumption is made that if the tank-venting arrangement is tight, then fuel vapor will have to be drawn out of the tank-venting arrangement by suction when the tank-venting valve is opened. If the air drawn in by suction by the internal combustion engine is enriched with fuel, it is then necessary to meter less fuel via the fuel-metering device in order to obtain a pregiven lambda value. For this purpose, the lambda controller has to change its actuating signal in the "lean" direction.

The problem however exists that cases often occur wherein hardly any fuel vapor is supplied from the tank-venting arrangement. This is especially the case when the fuel disposed in the tank has already lost all components having higher boiling points because of previous operation at higher temperature or when the fuel is relatively cool because of the ambient temperature or because of cooling by means of climate control equipment. In these cases, no lean correction is required by the lambda control when the tank-venting valve opens. The use of the suggested method would here cause a determination to be made that the tank-venting arrangement leaks even though no statement as to the degree of tightness of this arrangement is possible.

SUMMARY OF THE INVENTION

It is therefore an object of the invention to provide a tank-venting arrangement wherein the inquiry is undertaken as to whether a lean correction is required when the tank-venting valve opens only when it can be assumed with great probability that fuel vapor is actually supplied from the tank-venting arrangement.

The tank-venting arrangement according to the invention includes: a tank; an adsorption filter connected to the tank; a tank-venting valve interconnecting the adsorption filter and the intake pipe of the engine; a control unit for driving the tank-venting valve so that it closes or opens; a pressure difference sensor for measuring the pressure difference between the pressure in the tank and the ambient pressure; and, an integrating unit for determining the time integral of the pressure difference.

The method of the invention checks a tank-venting arrangement which includes: a tank, an adsorption filter connected to the tank and a tank-venting valve. The method of the invention includes the steps of: closing the tank-venting valve; determining the pressure difference between the pressure in the tank and the pressure at the end of the line leading from the tank into the adsorption filter; forming a time integral of the above-mentioned pressure difference with the integrating time spans being time spans wherein a fuel vapor exchange takes place between the tank and the adsorption filter with the time integral being a measure of the quantity of fuel vapor exchanged; opening the tank-venting valve after the above-mentioned time integral has reached a pregiven value; checking as to whether, when the tank-venting valve is opened, a lambda controller must undertake a correction of the fuel metering in a lean direction and generating a lean correction signal if this is the case; and, using the lean correction signal as a criteria for the tightness of the tank-venting arrangement.

In order to simplify the configuration of the tank-venting arrangement, it is advantageous to substitute the ambient pressure for the pressure in the adsorption filter when determining the above-mentioned pressure difference. In this way, no large error is generated when determining the quantity of fuel vapor which is exchanged between the tank and the active charcoal filter; however, the advantage is afforded that a pressure difference sensor can be utilized directly at the tank without a connection to the adsorption filter.

With this arrangement and method of the invention, it is possible to avoid the error described initially, namely, to perforce draw the conclusion that a leak is present in the tank-venting arrangement when no lean correction is required when the tank-venting valve is opened even though this case can occur not only for leakage in the arrangement but also for fuel which hardly emits vapor. An integrating unit is provided which forms the above-mentioned time integral value which is a measure for the fuel vapor exchanged between the tank and the adsorption filter. For this reason, a prediction can always be made as to whether a lean correction of the lambda controller is to be expected when opening the tank-venting valve.

The manner in which the time integration is made is dependent upon the configuration of the tank-venting arrangement. In the first embodiment of the tank-venting arrangement, the tank and the adsorption filter are directly connected to each other and can include a throttle connected therebetween but with no valve. In the second embodiment of the tank-venting arrangement, the tank and the adsorption filter are connected to each other via an electrically drivable check valve.

If the tank and the adsorption filter are connected directly to each other, then every difference of the pressures between these two components (every pressure difference between the pressure in the tank and the ambient pressure) corresponds to a vapor exchange. Accordingly, the time integral is formed continuously starting at the time point of the closure of the tank-venting valve. If however a check valve is connected between the tank and the adsorption filter, then the time integration for determining the fuel vapor exchange can only take place in those time spans wherein the valve permits passage. If the valve is an electrically drivable check valve, then the time spans are easily determined since they correspond precisely to those time spans in which the check valve is driven so as to be open.

Defective diagnosis can be precluded with especially great reliability according to a further embodiment of the method of the invention wherein a diagnosis is first carried out after a time span wherein the tank-venting valve has been opened for a longer period of time and it has been established that not too much fuel has been supplied to the adsorption filter because of the measured pressures so that the assumption can be made that the adsorption filter is substantially regenerated. If the diagnosis is then carried out and a lean correction of the lambda controller is determined, it is certain that the correction was not caused by the fuel vapor which already had collected in the adsorption filter in advance of the start of the diagnosis. If this further embodiment is not utilized, then the case can develop that when the tank-venting arrangement has just developed a leak, for example, by an improper closure of the tank after tanking, it is first still detected that the tank arrangement is tight. The probability however is high that with the next diagnostic run the leakage will be determined since the adsorption filter was flushed in the previous sequence.

It is advantageous when the tank-venting valve opens during an idle phase or when the engine operation is below an air-flow threshold during a diagnostic sequence. This is advantageous since in this operating condition, an additional supply of fuel vapor via the air drawn in by suction has an especially great effect so that a lean correction of the lambda controller is especially reliably determined. The statement that the tank-venting valve is being opened as soon as the time integral reaches a pregiven value therefore does not mean that the tank-venting valve must perforce be opened directly at the occurrence of the above-mentioned condition. Rather, a delay can be had to determine if an idle condition occurs. However, it should not be a long delay since in the delay time so much fuel vapor is adsorbed in the adsorption filter that this filter becomes saturated. It is therefore purposeful, to open the tank-venting valve directly after reaching a first value of the time integral and to undertake this opening when an especially suitable operating condition occurs; however, to open the tank-venting valve perforce when the time integral has reached a still higher value which would indicate that the adsorption filter will soon be saturated.

The signal from the pressure difference sensor arranged on a tank-venting arrangement according to the invention can be utilized for further checking purposes than those presented above. If the sensor signal shows no change in pressure difference over a longer time span such as 15 to 30 minutes then the assumption is made that the tank is open, be it at the tank closure or be it at other components of the tank-venting arrangement or be it that the connecting lines to the pressure sensor are obstructed.

It is required to provide a large vapor flow from the tank to the adsorption filter for vehicles wherein the tank-venting arrangements are configured for vapor adsorption when tanking (on board vapor recovery system). These arrangements are advantageously operated without a checking valve and the diagnosis according to the invention is preferably carried out during tanking. In other tank-venting arrangements, it is in contrast more advantageous to make measurements when the engine is running and to switch a check valve or at least a throttle into the connection between the tank and the adsorption filter in order to obtain an adequately high pressure difference for reliably determining the flow of fuel vapor from the time pressure difference integral.

For the flow of fuel vapor from the tank to the adsorption filter what is important is the pressure difference between the beginning and the end of the connection between the two mentioned components. According to an especially advantageous embodiment of the invention, the pressure difference itself is not measured directly to determine this difference but instead this pressure difference is obtained with the aid of the pressure difference between the pressure in the tank and the ambient pressure. This measure is based on the recognition that the pressure at the end of the line leading into the adsorption filter is dependent upon the ambient pressure and the flow relationships in the filter. In the laboratory, the relationship between the pressure difference "tank/ambient" and the pressure difference "tank/pressure at the end of the line leading into the filter" can be determined for every tank-venting arrangement. The relationship can be represented by an equation or stored in a table to make it possible for practical operation of the arrangement to simply and quickly determine the correct difference for the time integration of the pressure difference according to the invention. In lieu of the equation or a table, it is also possible to store an equation or a table for the relationships of the pressure differences which represents the direct relationship between the pressure difference "tank/ambient" and the fuel quantity flowing per unit of time.

BRIEF DESCRIPTION OF THE DRAWINGS

The invention will now be described with reference to the drawings wherein:

FIG. 3 is a flowchart for explaining an embodiment of the method of the invention for checking the tightness of a tank-venting arrangement such as the arrangement shown in FIG. 1; and, FIG. 4 shows a portion of a flowchart for explaining changes in the method sequence when a tank-venting arrangement according to FIG. 2 is checked as to tightness and a determination is made as to the fuel vapor exchange via the check valve.

DESCRIPTION OF THE PREFERRED EMBODIMENTS OF THE INVENTION

Figure 1:
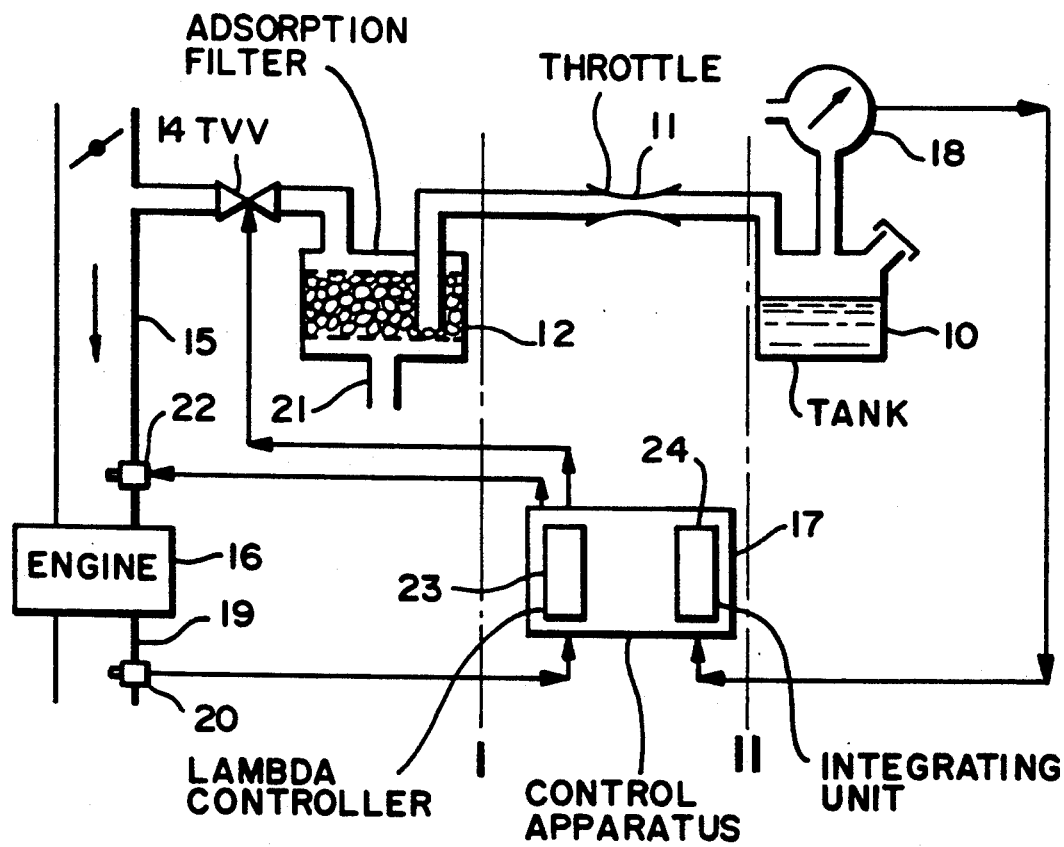
FIG. 1 is a schematic representation of a tank-venting arrangement according to the invention wherein the tank and the active charcoal filter are connected to each other via a throttle.

The tank-venting arrangement according to FIG. 1 includes the following components: a tank 10, a throttle 11, an active charcoal filter 12 in the form of an adsorption filter and a tank-venting valve (TVV) 14 which opens into the intake pipe 15 leading to an internal combustion engine 16.

The above components of the tank-venting arrangement are connected to each other in the above-mentioned series via connecting units. A control unit 17 is provided for controlling the arrangement. The control unit 17 receives a pressure difference signal from a pressure difference sensor 18 and a lambda control signal from a lambda probe 20 which is mounted in the exhaust-gas system 19 of the internal combustion engine 16.

The pressure difference signal 18 is mounted on the tank 10 in the embodiment shown. The pressure difference sensor 18 measures the pressure difference between the pressure in the tank and the ambient pressure. The pressure difference sensor 18 functions to determine the quantity of fuel which is exchanged between the tank 10 and the active charcoal filter 12. For this purpose, the sensor would have to measure the actual pressure difference between the pressure in the tank and the pressure in the active charcoal filter 12. However, no significant error is introduced by estimating the above-mentioned quantity of fuel exchanged when the ambient pressure is substituted for the pressure in the active charcoal filter. This substitution affords the advantage that no connecting line is required between the pressure difference sensor 18 and the active charcoal filter 12.

The control unit 17 emits signals to the tank-venting valve 14 and a fuel-metering device 22. A method for checking the tank-venting arrangement described above with respect to tightness is described with reference to FIG. 3.

After the start of the method of FIG. 3, that is after a decision is made that the tank-venting arrangement is to be checked, the tank-venting valve 14 is closed in a step s1. With the closure of the tank-venting valve, a time point TALT and an integration value IDP are both set to zero.

A step s2 is reached through a mark (A) wherein the pressure difference DP between the pressure PT in the tank and the ambient pressure PATM is measured. Thereafter, the actual time point T is detected (step s3) and the time duration $\Delta T$ between the instantaneous time point and the previous time point of the run-through of steps s2 and s3 is formed. Thereafter, the time integral of the pressure difference is formed (step s4), that is, the value $KDP = IDP + \Delta T \times DP$ is formed. The time integral is formed by an integrating unit 24 in the control unit 17. Further more, the value of TALT is set to the value of T. A mark (B) follows after the steps s2 to s4.

The particular method sequence between the marks (A) and (B) is dependent upon the configuration of the tank-venting arrangement between tank 10 and the active charcoal filter 12. As already described, the steps s2 to s4 correspond to the configuration shown in FIG. 1.

Following the mark (B) a check is made in a step s5 as to whether the integation value IDP is greater than a pregiven integration threshold value IDPSW. If this is not the case, the method steps starting at mark (A) are run through again. Otherwise, a check (step S5z) is made as to whether an operating condition is present wherein a lean correction can be determined as reliably as possible, that is, especially idle or an operating condition having a low air-mass flow. Only when such an operating condition is present (or when the charcoal filter must be regenerated because of the danger of saturation which however is not considered in the method sequence), the tank-venting valve is opened (step s6) and the actuating signal of a lambda controller 23 present in the control apparatus 17 is detected (step s7). In a step s8, a check is made as to whether the actuating signal indicates that a lean correction was required after the opening of the tank-venting valve. If this is the case, then the end of the diagnosis is reached without further measures. Otherwise, a fault announcement "arrangement leaks" is made. This fault announcement is then stored in a fault diagnostic memory. In addition, an acoustical or optical announcement signal can be triggered.

In this diagnostic sequence, it si problematical that the pressure difference sensor 18 indicates no pressure difference. This can either be for the reason that the fuel in the tank 10 does not vaporize or it can also be based on a leak in the tank and especially a leakage caused by an improperly closed tank. In order to distinguish these cases, the possibility is provided that the signal of the pressure difference sensor 18 is monitored for changes during a longer time span such as 15 to 30 minutes or a longer driving distance such as 10 to 20 km. If no changes occur in this time span, which would leave a pregiven area, the assumption is made that the tank leaks or the pressure difference sensor is defective.

In the embodiment of FIG. 1, the throttle unit 11 is present between the tank 10 and the active charcoal filter 12. This ensures that in addition to the flow resistance in the active charcoal filter, a further flow resistance is present so that even with small vapor flows, the pressure difference sensor 18 measuring with respect to the ambient supplies a reliable signal for the throughflow into the active charcoal filter. The throttling capacity of the throttle and whether it must be provided at all or whether it can be provided is dependent upon the overall dimensions of the tank-venting arrangement. The throttle may not limit the flow of fuel vapor to the extent that for a fuel from which vapors are intense, the pressure in the tank becomes so great that the danger of damage to the tank exists or that an overpressure valve opens to the ambient air in order to prevent damage of the tank.

Figure 2:
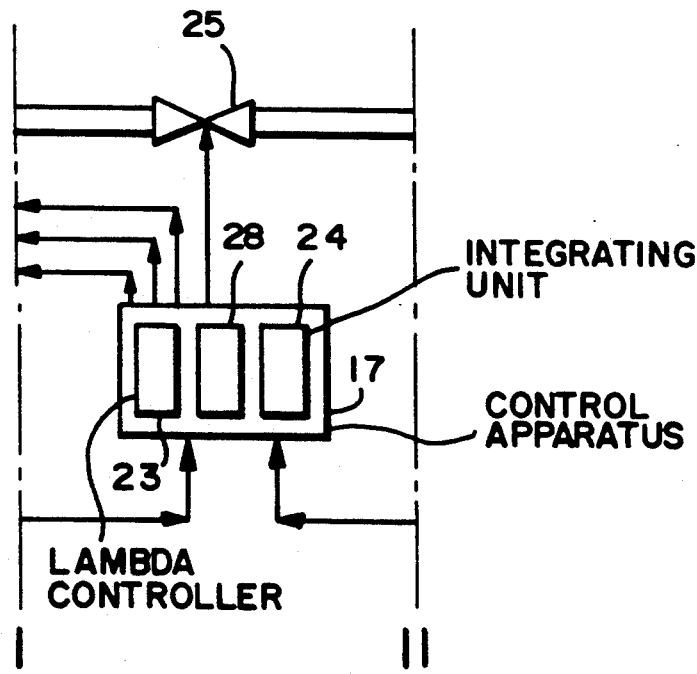
FIG. 2 is a partial view of a tank-venting arrangement according to another embodiment of the invention wherein the tank and an active charcoal filter are connected to each other via an electrically-drivable check valve.

The second embodiment of the tank-venting arrangement, which is shown in part in FIG. 2, differs from the embodiment shown in FIG. 1 in that a check valve 25 is provided between the tank 10 and the active charcoal filter 12 in lieu of the throttle 11. All other components outside of the lines I and II are the same as in the embodiment of FIG. 1.

In the second embodiment, the pressure difference signal from the pressure difference sensor 18 is used twice, namely, for forming the above-mentioned time integral and secondly for driving the check valve 25. The check valve 25 is only then opened when the overpressure in the tank 10 exceeds a pregiven value. Thus, an overpressure can build in the tank without fuel vapor flowing immediately into the active charcoal filter 12. In this way, the vaporized quantity is reduced.

A method for checking the tightness of the tank-venting arrangement of the embodiment of FIG. 2 is described with respect to the flowchart of FIG. 4.

The method carried out in connection with the second embodiment is distinguished from the method embodiment shown in FIG. 3 in that the method sequence between the marks (A) and (B) is changed. The method here is concerned with detecting the quantity of fuel vapor which flows through the check valve 25.

The pressure difference DP is determined, in the sequence according to FIG. 4, in a step s6.1 in correspondence to that explained above with respect to step s2. In a step s6.2, a check is made as to whether this difference is greater than an upper threshold pressure DPOSW. If this is the case, the check valve 25 is opened (step s6.3) and the opening time point TO is detected (step s6.4). A step s6.5 then follows. This step can also be reached when, in step s6.2, it develops that the pressure difference DP does not exceed the threshold DPOSW. In step s6.5, a check is made as to whether the pressure difference DP lies below a lower threshold DPUSW. If this not the case, then the mark (A) is reached again. Otherwise, the check valve is closed (step s6.6) and the closure time point TC is detected (step 6.7). With the aid of the opening time point TO and the closure time point TC as well as the pressure difference constant DPK, the time integral IDP of the pressure difference is formed as $IDP+DPK \times (TC-TO)$ in a step s6.8. It is assumed that the upper threshold pressure DPOSW is 60 mbar and the lower threshold pressure DPUSW is 30 mbar. It is then assumed that the pressure in the average lies at about half, that is approximately at 45 mbar. This value is used as the value for the pressure difference constant DPK. It is actually the case that for very short-term openings of the check valve, the average pressure lies closer to the upper threshold pressure while when the valve is opened longer, the mean pressure lies closer to the lower threshold pressure. If measurement errors are to be precluded which are caused in that the pressure difference constant DPK does not correspond precisely to the mean difference pressure, then an integration while using the actual measured pressure difference can take place as is the case in the steps s2 to s4 in the sequence of FIG. 3.

What is decisive for all embodiments described and further variations thereof not described herein of the tank-venting arrangement according to the invention is that a pressure difference sensor and an integrating unit with the pregiven described characteristics are present. For the variations of the method, the following are decisive: the time integral of the pressure differences mentioned above is formed, this time integral is taken as a measure for the fuel vapor exchange between the tank and the active charcoal filter, and, when it is detected that the charge of the active charcoal filter is sufficient for a reliable diagnosis of the arrangement for the next operating condition of the engine with sufficiently low throughput of air, the active charcoal filter is flushed and a lean correction of the lambda control is utilized for error detection.

It is understood that the foregoing description is that of the preferred embodiments of the invention and that various changes and modifications may be made thereto without departing from the spirit and scope of the invention as defined in the appended claims.

What is claimed is:

1. A method of checking the tightness of a tank-venting arrangement of a motor vehicle having an engine equipped with a lambda controller, the tank-venting arrangement including a tank, an adsorption filter, a line interconnecting the tank and the adsorption filter, and a tank-venting valve, the method comprising the steps of:

closing the tank-venting valve;

determining the pressure difference between the pressure in the tank and the pressure at the end of the line leading from the tank into the adsorption filter;

forming a time integral of said pressure difference with integration time spans being time spans wherein an exchange of fuel vapor occurs between the tank and the adsorption filter, said time integral being a measure of the quantity of fuel vapor which is exchanged;

opening the tank-venting valve after said time integral has reached a pregiven value;

checking whether the lambda controller must make a correction of the metering of fuel in the lean direction when the tank-venting valve opens and generating a lean correction signal if the lean correction is required; and, utilizing the lean correction signal as a criteria for the tightness of the tank-venting arrangement.

2. The method of claim 1, wherein said time integral is formed during tanking when said arrangement is configured for vapor adsorption, whereas for other arrangements, said time integral is formed during the trip made with the motor vehicle.

3. The method of claim 1, the method comprising the further steps of: determining said pressure difference by determining the pressure difference between the pressure in the tank and the ambient pressure; and, from this pressure difference and flow characteristics of the arrangement, drawing a conclusion as to said pressure difference.

4. The method of claim 1, wherein said line is a direct connecting line and said method including the further steps of: forming said time integral starting at the time point at which the tank-venting valve is closed because fuel vapor is exchanged continuously between the tank and the adsorption filter because of the configuration of said line as a direct connecting line.

5. The method of claim 1, wherein an electrically actuable check valve is included in the line between the tank and the adsorption filter; and, the method further comprising the steps of:

opening the check valve as soon as said pressure difference exceeds an upper threshold pressure and closing the check valve as soon as said pressure difference drops below a lower threshold value; and, forming said time integral during the time span wherein said check valve is open for detecting the vapor quantities flowing from the tank to the adsorption filter.

6. The method of claim 1, comprising the further step of checking as to whether, over a longer pregiven time span or trip distance, the pressure difference does not change; and, if no change occurs, then concluding herefrom that a fault is present in the tank-venting arrangement.

7. A tank-venting arrangement comprising:

a tank;

an adsorption filter connected to said tank;

a tank-venting valve connected to said adsorption filter;

a control apparatus for driving said tank-venting valve for closing and opening said valve;

pressure-difference sensor means for measuring the pressure difference between the pressure in said tank and ambient pressure;

integrating means for determining the time integral of said pressure difference; and, a line interconnecting said tank and said adsorption filter which is continuously clear.

8. A tank-venting arrangement comprising:

a tank;

an adsorption filter connected to said tank;

a tank-venting valve connected to said adsorption filter;

a control apparatus for driving said tank-venting valve for closing and opening said valve;

pressure-difference sensor means for measuring the pressure difference between the pressure in said tank and ambient pressure;

integrating means for determining the time integral of said pressure difference;

a check valve interconnecting said tank and said adsorption filter;

said control apparatus being connected to said check valve for electrically driving said check valve to open and close; and, said integrating means being adapted to form said time integral during those time spans wherein said check valve is open.

* * * * *

UNITED STATES PATENT AND TRADEMARK OFFICE
CERTIFICATE OF CORRECTION

PATENT NO. : 5,220,896

DATED : June 22, 1993

INVENTOR(S) : Andreas Blumenstock, Helmut Denz, Ulrich Steinbrenner and Ernst Wild It is certified that error appears in the above-identified patent and that said Letters Patent is hereby corrected as shown below:

In column 5, line 55:  delete "KDP" and substitute -- IDP -- therefor.

In column 5, line 57:  delete "Further more" and substitute -- Furthermore -- therefor.

In column 5, line 66:  delete "integation" and substitute -- integration -- therefor.

In column 6, line 1:  delete "step S5z" and substitute -- step s5z -- therefor.

In column 6, line 22:  delete "si" and substitute -- is -- therefor.

In column 7, line 26:  delete "step 6.7" and substitute -- step s6.7 -- therefor.

Signed and Sealed this

Twelfth Day of April, 1994

BRUCE LEHMAN

*Attest:*

*Attesting Officer*

Commissioner of Patents and Trademarks